Feb. 13, 1940.  J. W. KABER  2,190,210

DECALCOMANIA AND METHOD OF PREPARING SAME

Filed Nov. 23, 1937

INVENTOR
JOSEPH W. KABER
BY
Brockett, Hyde, Higley & Meyer
ATTORNEYS

Patented Feb. 13, 1940

2,190,210

UNITED STATES PATENT OFFICE 2,190,210

DECALCOMANIA AND METHOD OF PREPARING SAME

Joseph W. Kaber, Shaker Heights, Ohio

Application November 23, 1937, Serial No. 176,098

13 Claims. (Cl. 41—33)

My invention relates to an improved transfer composition and to an improved decalcomania and the method of preparing same. The transfer portion of my improved decalcomania is of a type that may be applied to glassware, pottery or enameled surfaces and which when fired produces a design in one or more registered or superimposed colors having clear sharp outlines.

An object of my invention is to provide an improved transfer composition or ink for use in preparing decalcomanias, which composition or ink may be applied to decalcomania paper by printing, lithographing, by the rotogravure or offset method, or may be sprayed or squeegeed through a stencil, and which composition or ink is characterized by the fact that it does not evaporate quickly when exposed to the atmosphere but dries immediately when applied to a lacquer film containing a cellulose ester or ether, such as decalcomania paper coated with such a film.

Another object of my invention is to provide an improved decalcomania, the print or design on which is applied in the form of an ink or coating composition which dries immediately when applied to a lacquer film containing a cellulose ether or ester, and by means of which one or a plurality of colors may be applied in registered or superimposed relationship to a suitable surface to be decorated.

A further object of my invention is to provide an improved decalcomania which is particularly suitable for applying designs to glassware, pottery, enameled surfaces and the like in one or a plurality of superimposed or registered colors, and which when fired produces a permanent decoration in clear and sharp outlines.

My invention will be better understood by reference to the accompanying drawing, in which—

Figure 1:
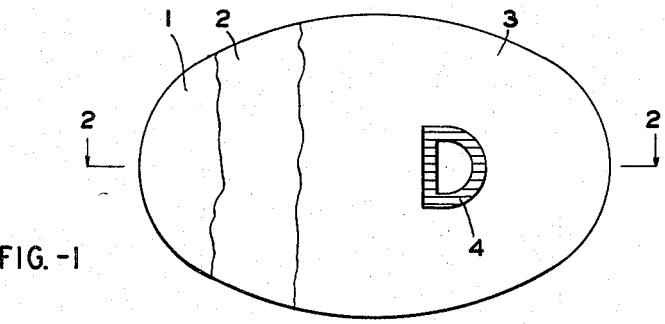
Fig. 1 is a perspective view of a decalcomania.

In practicing my invention, an improved ink or coating composition which constitutes an important feature of my invention is prepared. My improved ink may be composed of ceramic powders, a cellulosic binder which may be formed of a cellulose ester, such as cellulose acetate or cellulose nitrate, or a cellulose ether, such as ethyl or benzyl cellulose, and one or more solvents for the cellulosic material having low vapor pressures. A thinner or diluent of the high vapor pressure type which may be a solvent for the cellulosic material is also preferably utilized. My improved ink or composition may also be prepared in a more dilute form by mixing ceramic powders and one or more low vapor pressure solvents to ordinary commercial lacquers, such as those containing a solvent for the cellulosic compound, a plasticizer and one or more solvents.

The ceramic powder is composed of a metallic pigment of any suitable color, such as cobalt oxide, copper oxide, manganese oxide, iron oxide, or any desired mixture thereof to give the desired color. The pigment or combination of pigments, is mixed with a suitable flux, such as borosilicate or a metal borosilicate, such as lead, or an alkali or alkaline earth metal borosilicate, such as sodium, potassium, calcium or barium borosilicate. Such fluxes may be prepared by mixing silica, boric oxide and lead oxide together in the desired proportions or an alkali or alkaline earth metal oxide may be substituted for part or all of the lead oxide. In the ceramic powder as thus prepared, the pigment may constitute from approximately 10% to 25% and the flux from 75% to 90% of the composition.

In forming one embodiment of my improved ink, a composition or vehicle is first prepared containing the cellulose ester or ether, a solvent, or mixture of solvents for the cellulosic compound and preferably a diluent. The solvent is of the low vapor pressure type, that is, it does not vaporize before application. The solvent, however, is characterized by the fact that it dries immediately when applied to a cellulose lacquer film. For instance, glycol diacetate, diglycol diacetate, diethylene glycol monomethyl ether, diethylene glycol monoethyl ether, diethylene glycol monobutyl ether, the acetate of diethylene glycol monobutyl ether, acetonylacetone, or a mixture of two or more of such solvents may be employed. A diluent or solvent for the cellulose compound having a comparatively high vapor pressure, such as methyl alcohol, ethyl alcohol or benzene is also preferably added. The ceramic powder containing the ceramic flux and pigment or mixture of pigments, prepared as described, is then mixed with this composition.

As illustrating my invention, inks having the following composition have proven satisfactory:

Ink No. 1

| | Ounces |
|---|---|
| Ceramic powder (color, red) | 16 |
| Nitrocellulose | 2 |
| Denatured alcohol | ¾ |
| Diethylene glycol monobutyl ether | 2½ |
| Acetate of diethylene glycol monobutyl ether | 1 |

Ink No. 2

| | Ounces |
|---|---|
| Ceramic powder (color, blue) | 16 |
| Nitrocellulose | 2½ |
| Denatured alcohol | ¾ |
| Diethylene glycol monobutyl ether | 3 |
| Acetate of diethylene glycol monobutyl ether | 1½ |

Figure 5:
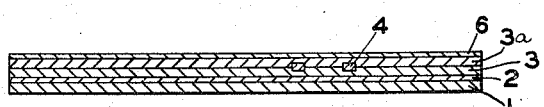
Fig. 5 is an enlarged cross sectional view of a decalcomania of a different type.
Figure 6:
Fig. 6 is a view similar to Fig. 5, showing a decalcomania of the same type as that shown in Fig. 5 but in a modified form.

Inks prepared according to the foregoing examples are of a heavy paste form and may be applied by printing or by squeegeeing the ink through a stencil. If it is desired, however, to apply the ink by spraying, by the offset method or by passing it between the rolls of coating machines, more diluent may be added. In preparing the decalcomania, the ink, thus provided, may be applied in the form of a letter or design to the cellulose lacquer coated film of decalcomania paper having a paper backing, a layer of a water soluble adhesive, such as gelatin, and the layer of a cellulose lacquer film applied over the adhesive, as illustrated in Figs. 1 to 4 of the drawing. The decalcomania shown in Figs. 5 and 6 is similar with the exception that after the letter or design has been formed upon the cellulose lacquer film, an additional layer of cellulose lacquer and a layer of adhesive are successively applied. In decalcomanias of the type shown in Figs. 1 to 4, inclusive, the letter or design is applied in the usual form, whereas in the type shown in Figs. 5 and 6 it is necessary to reverse the letter or design as will be later described. The paper backing may be formed of a single sheet of paper or may be of the duplex type, that is, it may consist of an outer heavy sheet and an inner thin sheet.

As illustrated in Fig. 1 of the drawing, the design is shown applied to a paper backing 1 coated with a thin layer of a water soluble adhesive 2, such as gelatin, and a layer of lacquer 3. The coating 3 may be formed of any of the commercial cellulose lacquers now on the market. For instance, it may be prepared by adding approximately 15% of a plasticizer, such as dibutyl phthalate and 25% by weight of nitrocellulose having a viscosity of ½ second to each gallon of a solvent containing a mixture of ethyl alcohol, butyl alcohol, ethyl acetate and butyl acetate. After the lacquer coating 3 has thoroughly dried, my improved ink is applied, as shown by the design 4. The design may be applied upon the lacquer coating 3 by means of a printing press or by the lithograph or rotogravure process or may be applied through a stencil by spraying or by squeegeeing, or it may be applied by the silk screen process. In the silk screen process, a silk screen coated with a suitable material, which material is provided with openings in the form of letters or designs, is placed upon the lacquer coating and the ink is applied to the lacquer coating through the openings in the material and through the silk screen in registry therewith. Upon application of the ink to the dry lacquer coating 3, the ink dries quickly and consequently, if desired, inks having different colors may be superimposed immediately upon the lacquer coating 3 in registry with the design 4 or may be superimposed over part of the design. After the desired design or designs have been applied to the lacquer coating 3, the decalcomania thus prepared is dipped in water for about 10 seconds, the decalcomania is applied to the surface to be decorated and the transfer portion of the decalcomania slid off the paper backing thereof onto the surface to be decorated. The transfer portion of the decalcomania on such surface may then be fired at the desired temperature which volatilizes or decomposes the cellulosic binder and fuses the flux with which the colored pigments are associated. The flux colored by the pigments fuses into the surface to which the transfer portion of the decalcomania is applied carrying the colored pigment with it and forms on such surface a design in clear and distinct outlines. As previously stated the flux in the design may fuse at various temperatures, depending upon its composition. With my ceramic ink, the firing range is governed by the enamel flux which may be composed of ingredients which mature at any desired temperature. The flux should mature, however, at a temperature which is below or slightly below the fusing point of the article to be decorated. If the design is to be applied to glass, the composition of the flux is such that it fuses at a temperature of about 900° to 1500° F., in which case approximately 10% to 15% of pigment is present. When it is desired to apply the design to pottery, the proportion of the ingredients in the flux may be varied so that the fusion will range between 1400° and 2500° F., in which case approximately 15% to 25% of the pigment may be employed. In applying the design to vitreous enamelware, the composition of the flux may be such that it will fuse at 1350° to 1650° F. and the proportion of the pigments present may range from approximately 20% to 25%.

Figure 2:
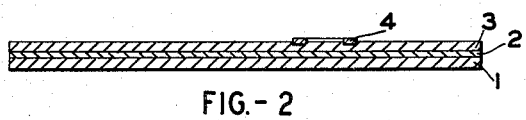
Fig. 2 is a cross sectional view on the line 2—2 of Fig. 1, showing the layers in enlarged form.
Figure 3:
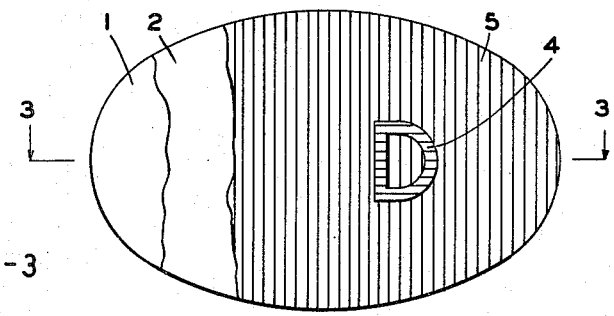
Fig. 3 is a perspective view of a modified form of decalcomania.
Figure 4:
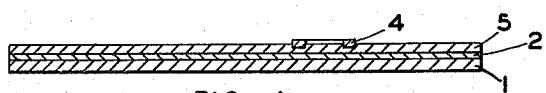
Fig. 4 is a cross sectional view on the line 3—3 of Fig. 3, showing the layers in enlarged form.

Instead of utilizing a clear lacquer solution as shown in Figs. 1 and 2 upon which the letter or design 4 is applied, ceramic powders of the type described and one or more solvents having a low vapor pressure, such as those specified, may be added to a suitable commercial lacquer to provide my improved ink in the form of a coating composition which may be applied upon the adhesive 2 as shown in Figs. 3 and 4 of the drawing. Any commercial cellulose lacquer containing solvents for cellulose esters or ethers of the medium vapor pressure type, such as ethyl acetate, butyl acetate or ethyl butyrate, and a plasticizer, such as dimethyl or diethyl phthalate, may be employed, although preferably the lacquer also contains a diluent or solvent of the high vapor pressure type, such as ethyl or butyl alcohol. For instance, a coating composition may be prepared by dissolving approximately 25% nitrocellulose and 10% dibutyl phthalate to each gallon of a solvent composed of a mixture of butyl acetate, ethyl acetate, ethyl alcohol and butyl alcohol, to which about 2 pounds of a powder containing a flux and a pigment, or mixture of pigments, to give the desired color, 5 ounces of diethylene glycol monobutyl ether and 3 ounces of acetate of diethylene glycol monobutyl ether, are added. This coating may be applied by any suitable means, such as by passing the adhesive coated paper 1 through a roller coating machine to which the coating composition is applied and then through a drying conveyor or the sheets may be placed upon racks and dried in any desired manner. Upon this coating layer 5 my improved ink may be applied to form a letter or design as indicated by the numeral 4, such ink drying immediately when applied to the coating layer 5.

In utilizing the decalcomania disclosed in Figs. 1 to 4, inclusive, the decalcomania is dipped in water for about 10 seconds and applied to the surface to be decorated and the transfer is slipped off the paper backing onto such surface. Upon firing the transfer, the letter or design will be fused upon the article when the decalcomania shown in Figs. 1 and 2 is employed, and when the decalcomania shown in Figs. 3 and 4 is utilized, a solid colored coating 5 will be fused upon the article and upon such coating is superimposed the colored design 4.

In Figs. 5 and 6, decalcomanias of a modified type are shown in cross section. As illustrated in Fig. 5, a paper backing 1 is coated with an adhesive 2 to which a layer of clear lacquer 3 of a commercial type is applied which is then dried. The ink, previously mentioned, containing ceramic powders is then applied in the form of the letter or design 4 which is applied in reverse form by printing or by the other methods specified. A layer of clear lacquer 3a and a layer of an adhesive 6 are then applied over the letter or design. The decalcomania is prepared for use by immersing it in water for about 10 seconds. The exposed adhesive surface 6 is then applied to the article and the backing paper is removed. Upon firing the transfer portion of the decalcomania, the cellulosic binder, solvents and adhesive are volatilized or decomposed and the flux artistically colored by the pigments fuses and penetrates into the article to form the design or letter in its standard form.

In Fig. 6 a somewhat similar decalcomania is shown in which 1 is the paper backing, 2 is a layer of adhesive, 3 is a layer of clear lacquer, 4 is a design formed of the ink containing the ceramic flux and pigment, 5 is a layer of the lacquer coating composition containing a ceramic flux and pigment of the type specified and 6 is a layer of adhesive. The transfer is applied in the same manner as that shown in Fig. 5.

From the foregoing description of my invention it will be seen that I have provided an improved transfer ink and coating composition in which solvents having a low vapor pressure are present and consequently the ink does not dry on printing presses or other machinery but dries immediately when applied to a lacquer film. A plurality of colors may therefore be printed in rapid succession in superimposed or registered relationship.

It will also be apparent that I have provided an improved process of producing decalcomanias in which a lacquer film is first applied to an adhesive coated paper backing which is then dried and which serves as a foundation layer upon which my improved transfer composition or ink may be applied in one or more registered or superimposed colors which dry immediately. By utilizing such a method a decalcomania is formed in which the colors do not stick to each other or have the tendency to become brittle.

It will also be seen that by utilizing ceramic powders containing a flux and colored pigments, the flux will fuse during firing and penetrate into the article to form a permanent decoration in distinct outlines and which is suitably colored by the pigment or mixture of pigments which are present.

What I claim is:

1. A decalcomania comprising an adhesive coated paper backing and a transfer portion superimposed upon the layer of adhesive, said transfer portion including a cellulose lacquer film and a design superimposed on said film comprising a powder including a ceramic flux and a pigment bound together by a cellulosic binder, and said transfer portion being substantially free from such elemental carbon and organic substances which would decompose to form nonvolatile carbonaceous material when said transfer portion is fired at a sufficient temperature to volatilize the cellulosic material.

2. In a decalcomania, a transfer portion including a cellulose lacquer film and a design superimposed thereon comprising a powder including a ceramic flux and a pigment bound together by a cellulosic binder, said transfer portion being substantially free from such elemental carbon and organic substances which would decompose to form nonvolatile carbonaceous material when said transfer portion is fired at a sufficient temperature to volatilize the cellulosic material.

3. A decalcomania comprising an adhesive coated paper backing and a transfer portion superimposed upon the layer of adhesive, said transfer portion including a cellulose lacquer film in which is interspersed a powder including a ceramic flux and a pigment and a design superimposed on said film comprising a ceramic flux and a pigment bound together by a cellulosic binder, and said transfer portion being substantially free from such elemental carbon and organic substances which would decompose to form nonvolatile carbonaceous material when said transfer portion is fired at a sufficient temperature to volatilize the cellulosic material.

4. In a decalcomania, a transfer portion including a cellulose lacquer film in which is interspersed a powder including a ceramic flux and a pigment, and a design superimposed on said film comprising a ceramic flux and a pigment bound together by a cellulosic binder, said transfer portion being substantially free from such elemental carbon and organic substances which would decompose to form nonvolatile carbonaceous material when said transfer portion is fired at a sufficient temperature to volatilize the cellulosic material.

5. A decalcomania comprising an adhesive coated paper backing and a transfer portion including a cellulose lacquer film, a design comprising a powder including a ceramic flux and a pigment bound together by a cellulosic binder, a second cellulose lacquer film superimposed upon said design and a layer of adhesive superimposed upon the second lacquer film for securing the transfer portion to a desired surface, said transfer portion being substantially free from such elemental carbon and organic substances which would decompose to form nonvolatile carbonaceous material when said transfer portion is fired at a sufficient temperature to volatilize the cellulosic material.

6. A decalcomania comprising an adhesive coated paper backing and a transfer portion including a cellulose lacquer film, a design comprising a powder including a ceramic flux and a pigment bound together by a cellulosic binder, a second cellulose lacquer film having a powder including a ceramic flux and a pigment interspersed therein and a layer of adhesive, said transfer portion being substantially free from such elemental carbon and organic substances which would decompose to form nonvolatile carbonaceous material when said transfer portion is fired at a sufficient temperature to volatilize the cellulosic material.

7. The method of preparing a decalcomania which comprises applying a cellulose lacquer coating to an adhesive coated paper, drying said lacquer to form a film and applying an ink composition to said film comprising a ceramic flux and pigment, a cellulosic binder, and a low vapor pressure solvent for said cellulosic binder, the solids and liquids in said ink composition being present in such relative proportions that it will dry immediately when applied to said lacquer film.

8. The method of preparing a decalcomania which comprises applying a cellulose lacquer coating to an adhesive coated paper, drying said lacquer to form a film and applying an ink composition to said film comprising a ceramic flux and pigment, a cellulosic binder comprising a cellulose ester, and a low vapor pressure solvent for said cellulosic binder, the solids and liquids in said ink composition being present in such relative proportions that it will dry immediately when applied to said lacquer film.

9. The method of preparing a decalcomania which comprises applying a cellulose lacquer coating to an adhesive coated paper, drying said lacquer to form a film and applying an ink composition to said film comprising a ceramic flux and pigment, a cellulosic binder comprising a cellulose ether, and a low vapor pressure solvent for said cellulosic binder, the solids and liquids in said ink composition being present in such relative proportions that it will dry immediately when applied to said lacquer film.

10. The method of preparing a decalcomania which comprises applying a coating of cellulose lacquer containing a ceramic flux and a pigment upon an adhesive coated paper to form a colored film in which said flux and ceramic powder are interspersed, drying said film, and then applying a design to the colored film in the form of an ink containing a cellulosic binder, a low vapor pressure solvent for said cellulosic binder, and a powder containing a ceramic flux and a pigment, the liquids and solids in said ink being present in such relative proportions that it will dry immediately when applied to said film.

11. The method of preparing decalcomanias which comprises applying a coating of a cellulose lacquer to an adhesive coated paper, drying said coating to form a lacquer film, impressing a design upon the lacquer film in the form of an ink containing a cellulosic binder, a low vapor pressure solvent for the cellulosic binder, and a powder containing a ceramic flux and a pigment, and then immediately applying another design with the same ink composition but of a different color upon at least a portion of the first design, the solids and liquids in said inks being present in such relative proportions that they will dry immediately when applied to said film.

12. The method of preparing a decalcomania which comprises applying a cellulose lacquer coating to an adhesive coated paper, drying said lacquer to form a film, applying an ink composition to said film comprising a powder containing a ceramic flux and a pigment, a cellulosic binder, and a low vapor pressure solvent for the cellulosic binder, the solids and liquids in said ink being present in such relative proportions that it will dry immediately when applied to said lacquer film, applying a cellulose lacquer coating over said ink composition to form a lacquer film, and applying a layer of adhesive to said last mentioned lacquer film.

13. The method of preparing a decalcomania which comprises applying a coating of cellulose lacquer upon an adhesive coated paper to form a film, drying said film, applying a design to the film in the form of an ink containing a cellulosic binder, a low vapor pressure solvent for the cellulosic binder, and a powder containing a ceramic flux and a pigment, the liquids and solids in said ink being present in such relative proportions that it will dry immediately when applied to said film, applying a coating of a cellulose lacquer containing a ceramic flux and pigment over said design to form a second lacquer film, and then applying a layer of adhesive to the second lacquer film.

JOSEPH W. KABER.